(No Model.)
A. & W. SEITZ.
FAN.
No. 271,528. Patented Jan. 30, 1883.
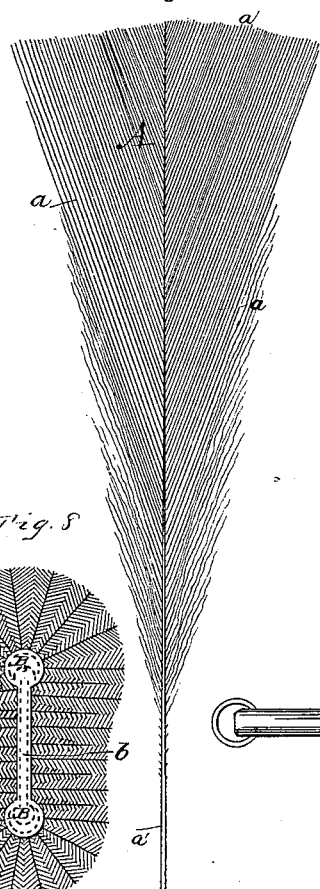
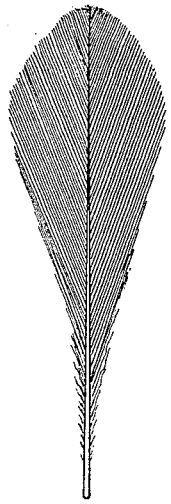
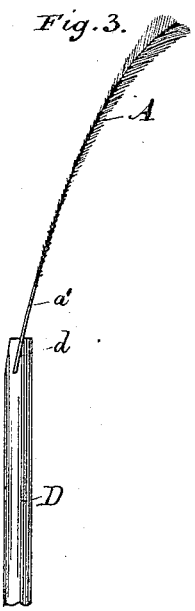
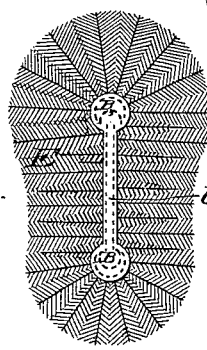
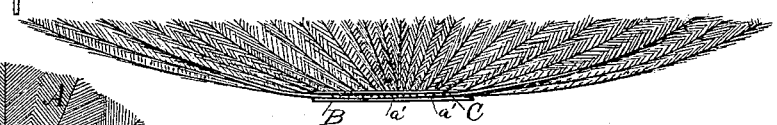
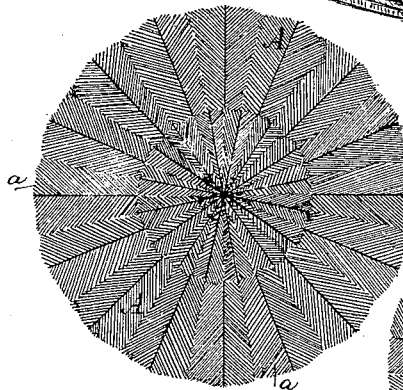
Witnesses:
W. B. Masson.
J. S. Barker
Inventors
Albert Seitz and William Seitz
by H. H. Doubleday, atty.

UNITED STATES PATENT OFFICE.

ALBERT SEITZ AND WILLIAM SEITZ, OF WASHINGTON, D. C.

FAN.

SPECIFICATION forming part of Letters Patent No. 271,528, dated January 30, 1883.

Application filed April 17, 1880. (No model.)

*To all whom it may concern:*

Be it known that we, ALBERT SEITZ and WILLIAM SEITZ, both of Washington, in the District of Columbia, have invented certain new and useful Improvements in Fans; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1 represents a feather taken from the body of an ordinary turkey. Fig. 2 represents a corresponding feather taken from the body of a chicken. Fig. 3 illustrates the relative positions of the handle and fan-body when attached. Fig. 4 is a view of the handle of the fan detached. Fig. 5 is a transverse section taken on line $x\,x$ of Fig. 6. Fig. 6 is a top plan view of a fan embodying our improvements. Fig. 7 represents a modified construction of the fan. Fig. 8 is a plan or face view of a fan constructed the same as those shown in the other figures, except that it is elongated, and the clips are made with two expanded end pieces and an arm or strip connecting them.

From an examination of Figs. 1 and 3 the shape of the feather A, taken from the body of the common turkey, will be distinctly seen, it having a substantially straight outer edge, as shown at $a$, and being also perceptibly curved longitudinally, as shown in Fig. 3. As the purpose of this invention is to provide a concave fan of feathers extending continuously from the center to the circumference, this shape of feather has been found the most advantageous of any experimented with. These feathers are the most abundant in the market, and by means of them the fan can be manufactured much more cheaply than with any other species.

By comparing Figs. 1 and 2 (Fig. 2 showing a feather from the body of a chicken corresponding to that shown in Fig. 1 from the body of a turkey) it will be understood that the fans can be manufactured much more rapidly and cheaply by means of that shown in Fig. 1 than the ordinary chicken-feather, the latter not only being much shorter, but also being rounded at its outer end, and thus forming a greatly-broken circumference for the fan.

Heretofore in the construction of feather fans it has been customary to secure together the sets of radially-arranged feathers by inserting the quills into radial apertures in the shank or handle. The manufacture of such shanks or handles greatly enhances the cost of the articles, and one of the purposes of this invention is to provide a durable and ornamental, but exceedingly cheap method of securing the feathers together.

In Fig. 5, B represents a disk of paper, cardboard, or cloth sufficiently stiff. Upon this the feathers are arranged as shown in said figure, the concave sides of all the feathers being placed in the same direction. If it be desired to form a completely-circular fan, the feathers are arranged contiguously, as shown in Fig. 6. If it be desired to form a segmental fan, the feathers are arranged in a similar manner through a portion of the circle, as shown in Figs. 3 and 7. C represents another disk or piece of paper, or suitable material to form a clamp, placed against the quills on the side opposite to the part B. By means of stitching or glue or other adhesive substance the quills of the feathers at $a'$ and the parts B and C are securely fastened together, and the body of the fan is ready for attachment to the handle D. (Shown detached in Fig. 4.) At the upper end the handle is provided with a slot, $d$, situated in a line inclined to the axis of the handle, as shown in said figure. The body of the fan is attached to the handle D by means of the parts B and C and the quills, which are inserted in the slot $d$ and secured therein by glue, or in any other preferred manner. When attached to the handle thus the fan occupies the inclined position relative to the handle shown in Fig. 3, so that it can be conveniently used as a parasol or sunshade as well as for a fan, as will be readily understood. By an examination of Fig. 5 it will be seen that the fan-body is formed of separate feathers, which are so attached together that the inner ends of the quills are all in the same plane, the inner end of each quill (while the feather is in its natural state) being substantially straight for all practical purposes, and by examining Fig. 3 it will be seen that the handle is so attached to the feather-body as to have the axis of the handle very perceptibly inclined to the plane in which lie the quill ends of the feathers.

The inclination of the slot $d$ may be varied as desired.

Mats for lamps or for other ornamental purposes may be formed in the manner described above for making the circular body of the fan, in which case the handle necessary for the fan or parasol would not be required.

We are aware that fans have been constructed in which feathers extended continuously from the center to the circumference throughout the body of the fan, and also that combined feather fans and parasols have been attached to handles by means of hinges, and we do not claim these constructions as our invention.

The same method of joining and supporting the feathers may be followed in constructing devices that can be used both as fans and fly-brushes. A device for such purpose is shown in Fig. 8, wherein use is made of an elongated body formed of feathers and clamps. The clamps are each constructed with expanded parts B B, to which are attached feathers in the manner already described. The expanded end pieces, B, of the clamps are connected by an intermediate arm or piece, $b$, to which feathers are attached on substantially-parallel lines, projecting laterally in both directions to form an intermediate body part, E, between the circular parts. To the elongated body thus formed the handle is secured by slotting the latter and inserting the body within the slot, as above described.

We do not in this case claim any of the matters which we have shown and described, except those specifically set forth in the following claim, reserving to ourselves the right to claim all other patentable matters in another application which we are about to file.

What we claim is—

The combination, with the handle having the slot $d$, of the fan-body, having the flexible clamps B C secured to the body by being inserted into said slot, substantially as set forth.

In testimony that we claim the foregoing we have hereunto set our hands this 16th day of April, 1880.

ALBERT SEITZ.
WILLIAM SEITZ.

Witnesses:
J. S. BARKER,
M. P. CALLAN.